(12) United States Patent
Mak et al.

(10) Patent No.: US 8,902,366 B2
(45) Date of Patent: *Dec. 2, 2014

(54) SYSTEMS AND METHODS FOR TRIGGERING AN OUT OF FOCUS ALERT

(71) Applicant: Verint Systems Inc., Melville, NY (US)

(72) Inventors: Fuk Sang Mak, Hong Kong (CN); Hing Yip Chung, Hong Kong (CN); Tao Luo, Hong Kong (CN); Wai Shing Yiu, Hong Kong (CN); Chi Kin Lee, Hong Kong (CN); Shiu Hang Tsang, Hong Kong (CN)

(73) Assignee: Verint Systems Inc., Santa Clara, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 13/731,216

(22) Filed: Dec. 31, 2012

(65) Prior Publication Data

US 2013/0135530 A1    May 30, 2013

Related U.S. Application Data

(63) Continuation of application No. 11/937,553, filed on Nov. 9, 2007, now Pat. No. 8,345,162.

(51) Int. Cl.
| | | |
|---|---|---|
| *H04N 5/00* | (2011.01) | |
| *H04N 5/232* | (2006.01) | |
| *H04N 19/176* | (2014.01) | |
| *H04N 7/18* | (2006.01) | |
| *H04N 5/225* | (2006.01) | |
| *H04N 17/00* | (2006.01) | |
| *H04N 5/21* | (2006.01) | |
| *H04N 19/85* | (2014.01) | |
| *H04N 19/48* | (2014.01) | |
| *H04N 19/14* | (2014.01) | |

(52) U.S. Cl.
CPC ............ *H04N 5/225* (2013.01); *H04N 5/23212* (2013.01); *H04N 19/00278* (2013.01); *H04N 7/181* (2013.01); *H04N 17/002* (2013.01); *H04N 5/21* (2013.01); *H04N 19/00903* (2013.01); *H04N 19/00563* (2013.01); *H04N 19/00157* (2013.01)
USPC ........... 348/607; 348/326; 348/345; 348/346; 348/745; 348/806; 348/E9.021; 348/E3.048; 348/E5.045

(58) Field of Classification Search
CPC ............................. H04N 3/26; H04N 5/23212
USPC ............ 348/326, 346, 607, 745, 806, E9.021, 348/E3.048, E5.045
See application file for complete search history.

(56) References Cited

U.S. PATENT DOCUMENTS

| | | | | |
|---|---|---|---|---|
| 5,065,246 | A * | 11/1991 | Takemoto et al. | ............ 348/354 |
| 6,119,083 | A * | 9/2000 | Hollier et al. | .................. 704/243 |
| 8,126,255 | B2 * | 2/2012 | Bhaskar et al. | ................ 382/141 |
| 2005/0063475 | A1 * | 3/2005 | Bhaskaran | ................ 375/240.29 |
| 2007/0217686 | A1 * | 9/2007 | Yamamoto | .................... 382/218 |

* cited by examiner

*Primary Examiner* — Pankaj Kumar
*Assistant Examiner* — Sahar Baig
(74) *Attorney, Agent, or Firm* — Meunier Carlin & Curfman

(57) ABSTRACT

In order to trigger an out of focus alert when the focus level of a video frame meets a focus criteria, a method is performed including the operations of: receiving a video frame, partitioning the video frame into a plurality of blocks, calculating an array of discrete cosign transformation (DCT) coefficients for at least one of the plurality of blocks using a DCT, classifying each of the at least one of the plurality of blocks based on the array of DCT coefficients for that block, calculating a focus level of the video frame from the block classifications, and triggering an out of focus alert if the focus level meets a focus criteria.

20 Claims, 8 Drawing Sheets

| 1 | 2 | 2 | 2 | 4 | 4 | 8 | 8 |
|---|---|---|---|---|---|---|---|
| 2 | 2 | 2 | 4 | 4 | 8 | 8 | 16 |
| 2 | 2 | 4 | 4 | 8 | 8 | 16 | 16 |
| 2 | 4 | 4 | 8 | 8 | 16 | 16 | 32 |
| 4 | 4 | 8 | 8 | 16 | 16 | 32 | 32 |
| 4 | 8 | 8 | 16 | 16 | 32 | 32 | 64 |
| 8 | 8 | 16 | 16 | 32 | 32 | 64 | 64 |
| 8 | 16 | 16 | 32 | 32 | 64 | 64 | 128 |

Figure 3

SYSTEMS AND METHODS FOR TRIGGERING AN OUT OF FOCUS ALERT

CROSS-REFERENCE TO RELATED APPLICATION

The present application claims priority pursuant to 35 U.S.C. §119(e) to U.S. Provisional Application Ser. No. 60/952,896 entitled, "Video Processing," filed on Jul. 31, 2007, which is hereby incorporated by reference in its entirety. The present application is also a continuation of and claims priority to U.S. patent application Ser. No. 11/937,553, filed on Nov. 9, 2007 entitled SYSTEMS AND METHODS FOR TRIGGERING AN OUT OF FOCUS ALERT, which is hereby incorporated by reference in its entirety.

TECHNICAL FIELD

This disclosure is related to the field of video imaging, and in particular, to the automatic triggering of an alert when a video frame is determined to be out of focus.

BACKGROUND

Currently video cameras are used for a variety of purposes, including security cameras, data collection, web cameras, and many other uses. Often, a video camera will be configured to continually capture video data without much if any interaction with a user. However, it is possible for the camera to lose its focus due to a variety of reasons. In such a case, the out of focus camera may not be recognized for a period of time.

SUMMARY

In this regard, systems and methods for triggering an out of focus alert are provided. An exemplary embodiment of such a method comprises receiving a video frame, partitioning the video frame into a plurality of blocks, calculating an array of discrete cosign transformation (DCT) coefficients for at least one of the plurality of blocks using a DCT, classifying each of the at least one of the plurality of blocks based on the array of DCT coefficients for that block, calculating a focus level of the video frame from the block classifications, and triggering an out of focus alert if the focus level meets a focus criteria.

An exemplary embodiment of a system comprises a storage system containing software, and a processing system coupled to the storage system. The processing system is instructed by the software to receive a video frame, partition the video frame into a plurality of blocks, calculate an array of discrete cosign transformation (DCT) coefficients for at least one of the plurality of blocks using a DCT, classify each of the at least one of the plurality of blocks based on the array of DCT coefficients for that block, calculate a focus level of the video frame from the block classifications, and trigger an out of focus alert if the focus level meets a focus criteria.

An exemplary embodiment of a computer-readable medium of instructions for triggering an out of focus alert in a computer system comprises receiving a video frame, partitioning the video frame into a plurality of blocks, calculating an array of discrete cosign transformation (DCT) coefficients for at least one of the plurality of blocks using a DCT, classifying each of the at least one of the plurality of blocks based on the array of DCT coefficients for that block, calculating a focus level of the video frame from the block classifications, and triggering an out of focus alert if the focus level meets a focus criteria.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 3 is an illustration of the structure of a weight array according to an embodiment of the invention;

DETAILED DESCRIPTION

As discussed above, video cameras may go out of focus for a wide variety of reasons, including tampering. In order to alert a user when a camera goes out of focus, a method for monitoring the focus level of a video camera, and automatically triggering an alert when the focus level meets a focus criteria is presented. While some current cameras have the ability to auto-focus, this feature is not perfect. For example, the camera may focus on an object at a different distance from the camera, other than the object of interest in the video frame. For a wide variety of reasons, it may be desired to configure a video camera for manual focus on a particular area of interest. Unless this camera is continually monitored, it is possible for the camera to go out of focus without being observed. By measuring the focus level of a video frame, and comparing this focus level to a criteria, an apparatus or method is configured to trigger an alert when the focus level is reduced to a level meeting the criteria.

Figure 1:
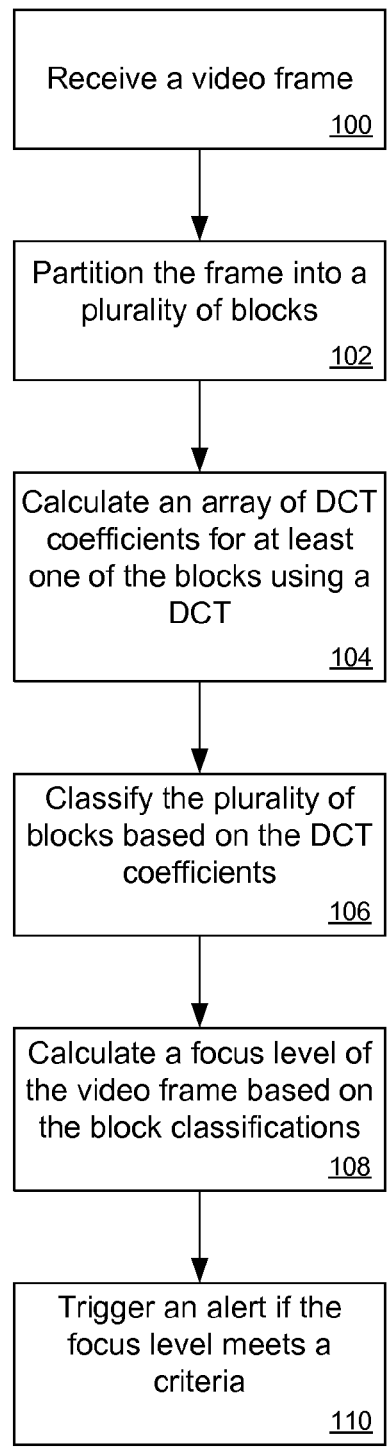
FIG. 1 is a flowchart illustrating a method for triggering an alert according to an embodiment of the invention.

FIG. 1 is a flowchart illustrating a method for triggering an alert according to an embodiment of the invention. In operation 100, a video frame is received. In operation 102, the video frame is partitioned into a plurality of blocks. In some example embodiments, the video frame may be partitioned into 8 pixel by 8 pixel blocks, while other embodiments may use other block sizes and shapes all within the scope of the present invention. In operation 104, an array of discrete cosign transform (DCT) coefficients are calculated for at least one of the plurality of blocks using a discrete cosign transform. In an example embodiment, a type-II DCT is used to calculate the array of DCT coefficients, while other embodiments may use other types of discrete cosign transforms, all within the scope of the present invention. Also, those of skill in the art will note that this method does not require the calculation of DCT coefficients for all of the blocks in the video image. For a variety of reasons, one or more of the blocks may be masked such that it does not enter into the focus calculations, all within the scope of the present invention. Masking will be discussed in detail below, with respect to FIG. 5.

In operation 106, the at least one of the plurality of blocks is classified into one of a number of different block types based on the arrays of DCT coefficients for each block. These block types and an example method of classification will be discussed in detail below, with respect to FIG. 7. In operation 108, a focus level is calculated for the video frame based on the block classifications. In operation 110, an alert is triggered if the focus level meets a criteria. Calculation of the focus level and the criteria are discussed in detail below, with respect to FIGS. 6 and 7.

Figure 2:
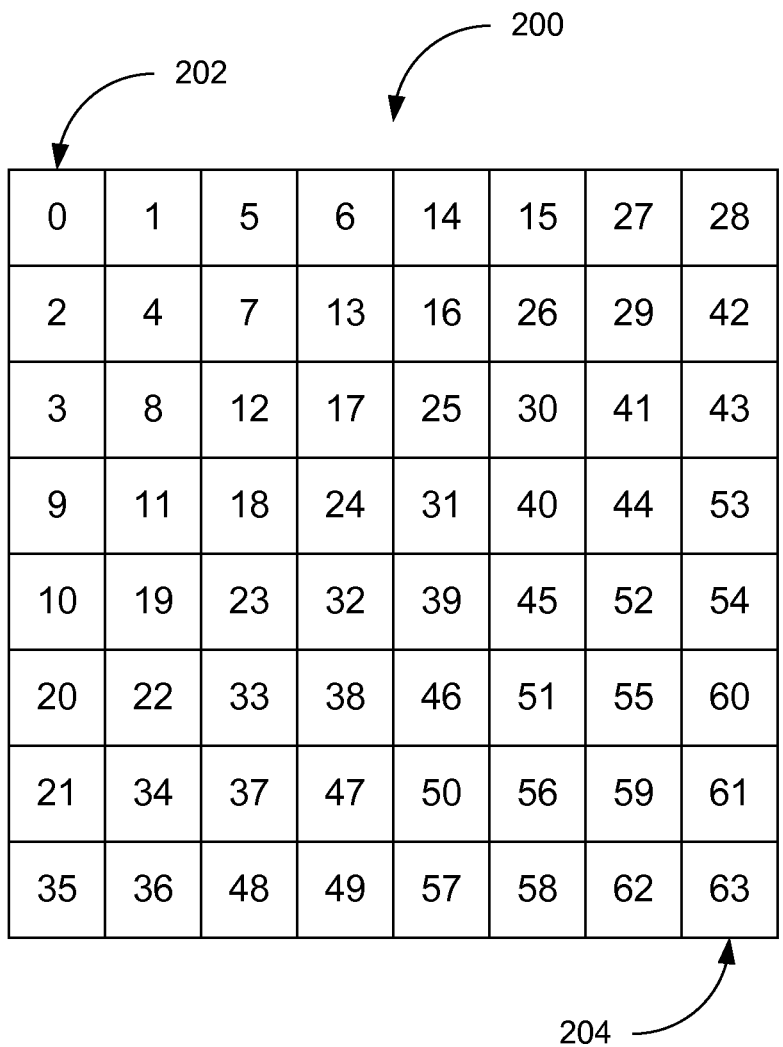
FIG. 2 is an illustration of the structure of an array of discrete cosign transformation coefficients according to an embodiment of the invention.

FIG. 2 is an illustration of the structure of an array of discrete cosign transformation coefficients according to an embodiment of the invention. A two-dimensional type-II DCT applied to a block of pixels may result in an 8×8 transform coefficient array. Some example embodiments may structure this data as a two-dimensional 8×8 array, while other embodiments may structure this data as a one-dimensional 64 element array, all within the scope of the present invention. The example embodiment described here organizes the DCT coefficient data into a one-dimensional 64-element array as illustrated in FIG. 2. The detailed calculations necessary to perform a discrete cosign transform are known to those of skill in the art and may be found in a number of reference works, and so are not described in detail herein. FIG. 2 shows a typical 8×8 DCT coefficient array 200 with an origin in the top-left corner at array element 0 202. Each entry in this DCT coefficient array 200 contains the strength of a different frequency component in the DCT. Entries in the array increase in horizontal and vertical spatial frequencies as they are found further to the right (horizontal) and down (vertical) from the origin. In this example embodiment a 64-element array, dct[0:63], is shown mapped onto the typical 8×8 DCT coefficient array. dct[0] 202 is the first element in the array and represents the DC (zero-frequency) component of the array. dct[63] 204 is the last element in the array, and represents the element with the highest horizontal and vertical spatial frequencies. The remaining array elements are organized as shown in FIG. 2. Notice that array elements with lower indexes in the array represent lower spatial frequencies, while array elements with higher indexes in the array represent relatively higher spatial frequencies.

Figure 3:
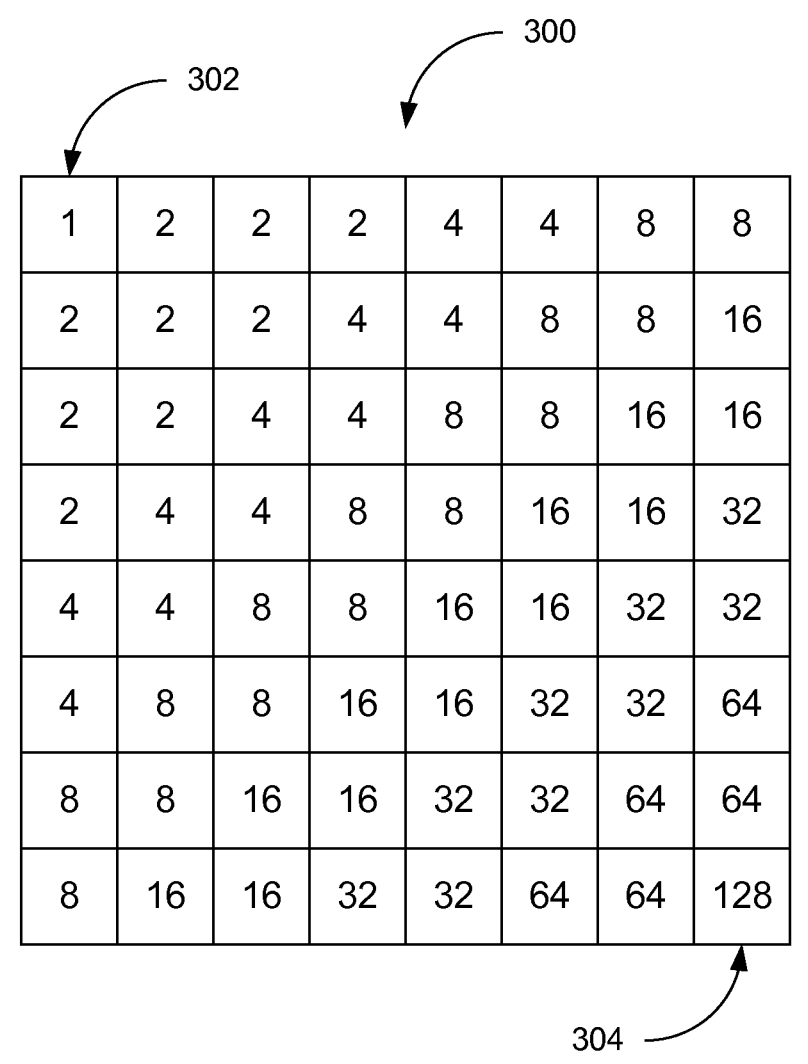

FIG. 3 is an illustration of the structure of a weight array according to an embodiment of the invention. This 64-element weight array follows the same structure as the array of DCT coefficients 200 shown in FIG. 2. For example, weight[0] 302 has a value of 1, and weight[63] 304 has a value of 128 in this example embodiment. Since higher frequency components of the array of DCT coefficients 200 are usually small in magnitude, some embodiments of the present invention weight the array of DCT coefficients 200 by a weight array 300, such as that shown in FIG. 3. In this example embodiment, the DC coefficient (dc[0]) 202 is multiplied by a weight (weight[0]) 302 of 1, and so remains unchanged. The coefficient with the highest spatial frequencies (dct[63]) 204 is multiplied by a weight (weight[63]) 304 of 128. Other embodiments may use other weight multipliers (or none at all) within the scope of the present invention.

Figure 4:
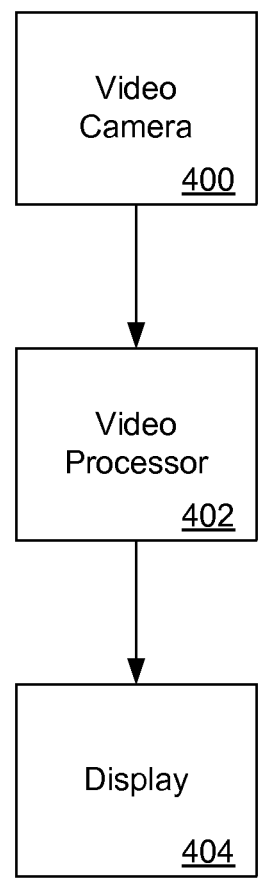
FIG. 4 is block diagram of a video system according to an embodiment of the invention.

FIG. 4 is block diagram of a video system according to an embodiment of the invention. In this example embodiment, a video camera 400 is coupled to a video processor 402, which in turn is coupled to a display 404. The video camera 400 is configured to send a series of video frames to the video processor 402. The video processor 402 receives video frames from the video camera 400, processes the video frames to determine the focus level of one or more of the video frames, and if the focus level meets a criteria, triggers an alert to the display 404, or otherwise alerts the user to the problem. Those of skill in the art will recognize that there are a very wide variety of video cameras and displays on the market, many of which may be configured to operate with the video processor 402 described herein, all within the scope of the present invention. Also, this video processor 402 may include any mix of hardware and software configured to operate in the methods described herein, all within the scope of the present invention. For example, the video processor 402 may include a general purpose computer configured to execute the operations of the methods described herein, while other examples may use video processors specifically designed for this purpose. One example computer system configured to act as a video processor 402 is described in detail below, with respect to FIG. 8.

Figure 5:
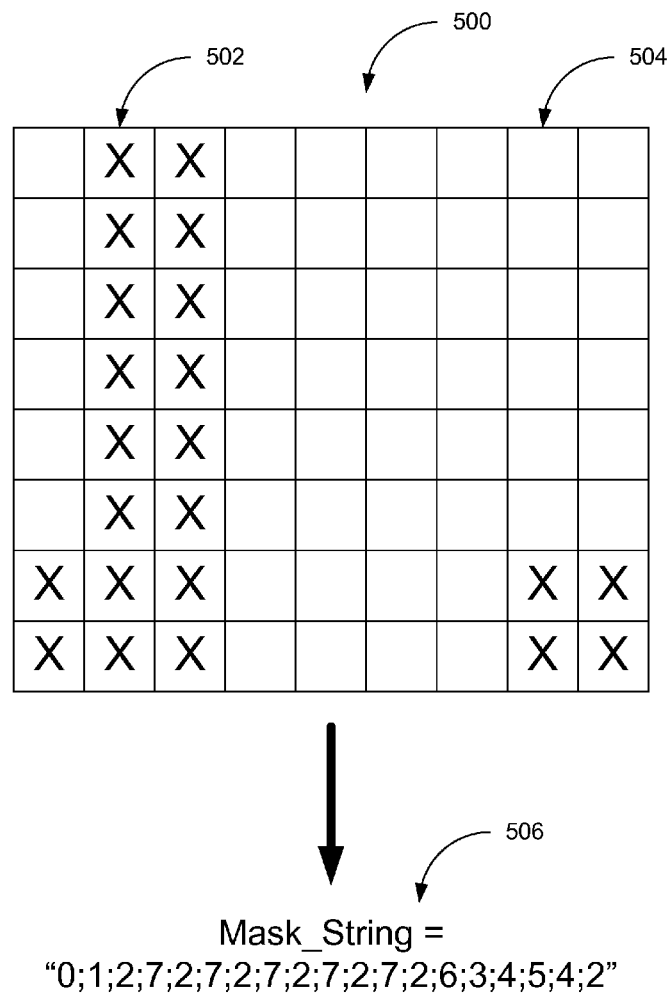
FIG. 5 is an illustration of a mask according to an embodiment of the invention.

FIG. 5 is an illustration of a mask according to an embodiment of the invention. In some situations, the video frames received from a video camera 400 may include elements that are not useful to a focus level calculation. In these situations, it may be desirable to mask out portions of the frame such that these masked areas are not included in the focus level calculation. Those of skill in the art will recognize that there are a very wide variety of methods available to mask out portions of a video frame, all within the scope of the present invention. For example, some embodiments may mask pixels within the video frame on a pixel-by-pixel basis. These masked pixels may be converted to a uniform mask color (such as black) so that they are not classified as sharp or unsharp in the block classification step. Still other embodiments, such as that shown in FIG. 5, mask out portions of the video frame on a block-by-block basis. In this example embodiment, an array of 9×8 blocks 500 is shown. These blocks may contain any number of pixels within the scope of the present invention. In this example, a number of blocks to be masked 502 from the focus level calculations are marked with an "X" while blocks to be used 504 in the focus level calculations are not marked. Those of skill in the art will recognize that there are a very wide variety of methods available to encode mask data, all within the scope of the present invention. In this example embodiment, a Mask_String 506 is created to represent the mask data in a string format. In this example, the Mask_String 506 includes a semi-colon separated series of number pairs. Each pair of numbers includes a number of masked blocks and then a number of unmasked blocks. The string is generated from the mask array 500 by examining the blocks in a left-to-right, top-to-bottom order. In this example, the initial block (in the upper left corner) is unmasked, so the first number pair is "0;1" representing no initial masked block, and the single initial unmasked block. The next number pair is "2;7" representing the two masked blocks in the top row followed by seven unmasked blocks. This example method continues in this manner to the end of the mask array, resulting in a final Mask_String 506 of "0;1;2;7;2;7;2;7;2;7;2;7;2; 6;3;4;5;4;2." This Mask_String 506 may then be used to determine which blocks will have a DCT run on them, saving computing time since masked blocks to not need to be examined and are not used in the focus level calculations.

Figure 6:
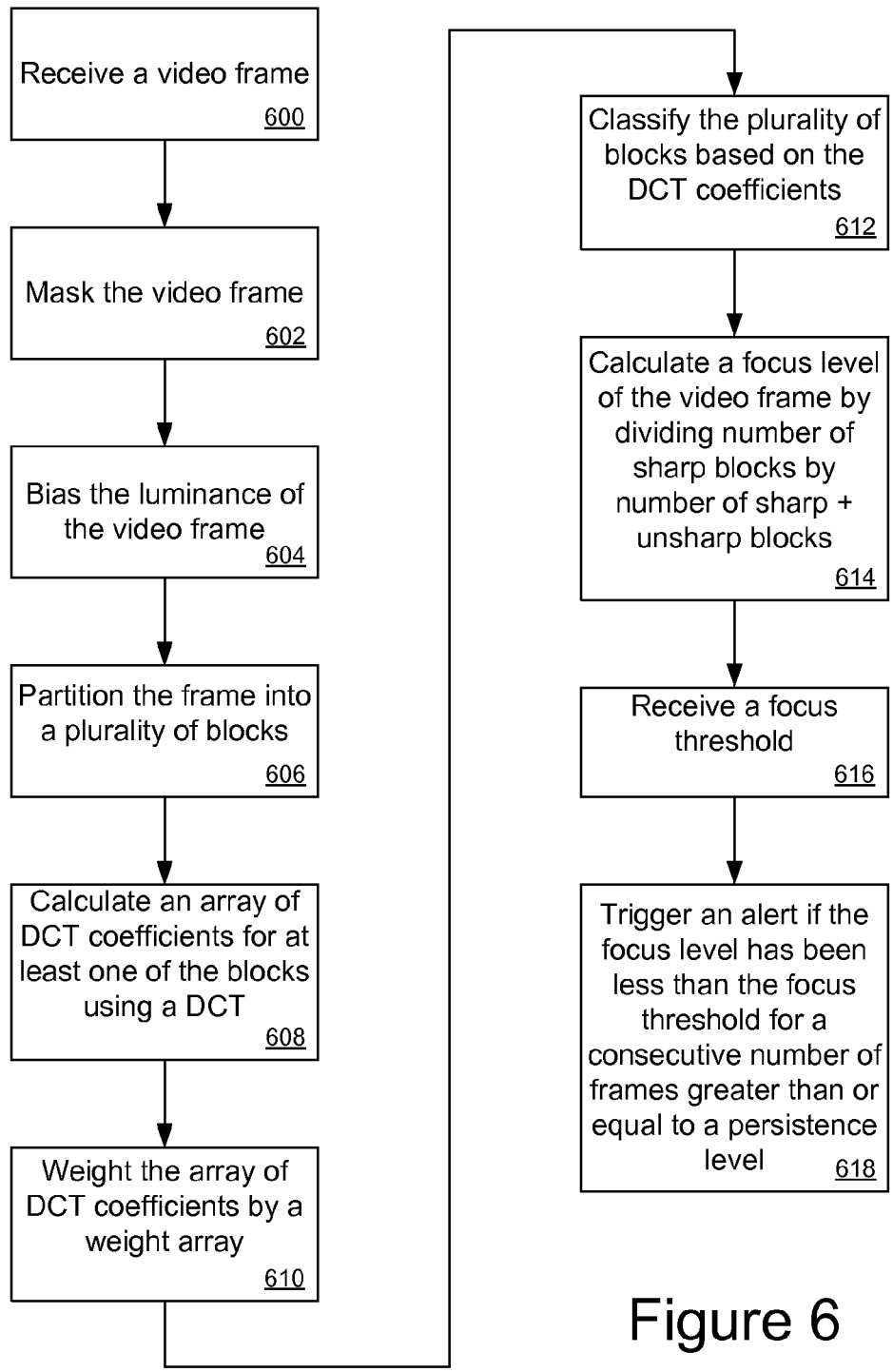
FIG. 6 is a flowchart illustrating a method for triggering an alert according to an embodiment of the invention.

FIG. 6 is a flowchart illustrating a method for triggering an alert according to an embodiment of the invention. In operation 600, a video frame is received. In operation 602, the video frame is masked as described above, with respect to FIG. 5. In operation 604, the luminance of the video frame is scaled. The luminance of the video frame may be scaled such that the method of measuring focus level is less sensitive to the light condition. In this example, the dynamic range of the luminance is normalized to values from 0 to 255. The maximum intensity of any pixel in the frame is represented by max Int, while the minimum intensity of any pixel in the frame is represented by min Int. A luminance scalar, $\alpha$, is calculated as follows:

$$\alpha = \frac{255}{[\max Int - (\min Int + 1)]}.$$

The intensity of each pixel is then scaled by $\alpha$ as follows:

$Int = \alpha * (Int - \min Int)$.

Other embodiments may scale the luminance in other ways, or may not scale the luminance at all, all within the scope of the present invention.

In operation 606, the video frame is partitioned into a plurality of non-overlapping blocks. In some example embodiments, the video frame may be partitioned into 8 pixel by 8 pixel blocks, while other embodiments may use other block sizes and shapes all within the scope of the present invention. In this example, the video frame block size matches the mask block size so that masked blocks are not processed. In operation 608, an array of discrete cosign transform (DCT) coefficients are calculated for at least one of the plurality of blocks using a discrete cosign transform. DCT coefficients are not calculated for masked blocks. In an example embodiment, a type-II DCT is used to calculate the array of DCT coefficients while other embodiments may use other types of discrete cosign transforms all within the scope of the present invention.

In operation 610, the array of DCT coefficients is weighted by the contents of a weight array, such as the array illustrated in FIG. 3 and described above. This weighting increases the influence of the higher spatial frequency components of the array of DCT coefficients, since these components tend to be very small, and normally would have little effect on focus level calculations. Those of skill in the art will recognize that there are a very wide variety of methods available to weight the array of DCT coefficients, all within the scope of the present invention. In operation 612, each of the at least one of the plurality of blocks that have been transformed, are classified into one of five different block types based on the arrays of DCT coefficients for each block. These five block types and an example method of classification will be discussed in detail below, with respect to FIG. 7. In operation 614, a focus level is calculated for the video frame based on the block classifications. The focus level is set equal to the number of sharp blocks divided by the sum of the number of sharp blocks and unsharp blocks. In operation 616, a focus threshold is received. This focus threshold may be pre-programmed, or may be obtained from a user. In operation 618, an alert is triggered if the focus level is less than the focus threshold, and has been less than the focus threshold for a set number of frames. The number for consecutive frames required before triggering an alert may be a fixed quantity, or may be set by a user. This quantity of frames is called a persistence level. For example, if the persistence level is set to five frames, then five consecutive out of focus frames must be detected before the alert is triggered. Those of skill in the art will recognize that there are a wide variety of methods available to alert a user of an out of focus event, such as displaying an alert on a display, sounding a tone, or flashing a light, all within the scope of the present invention.

Figure 7:
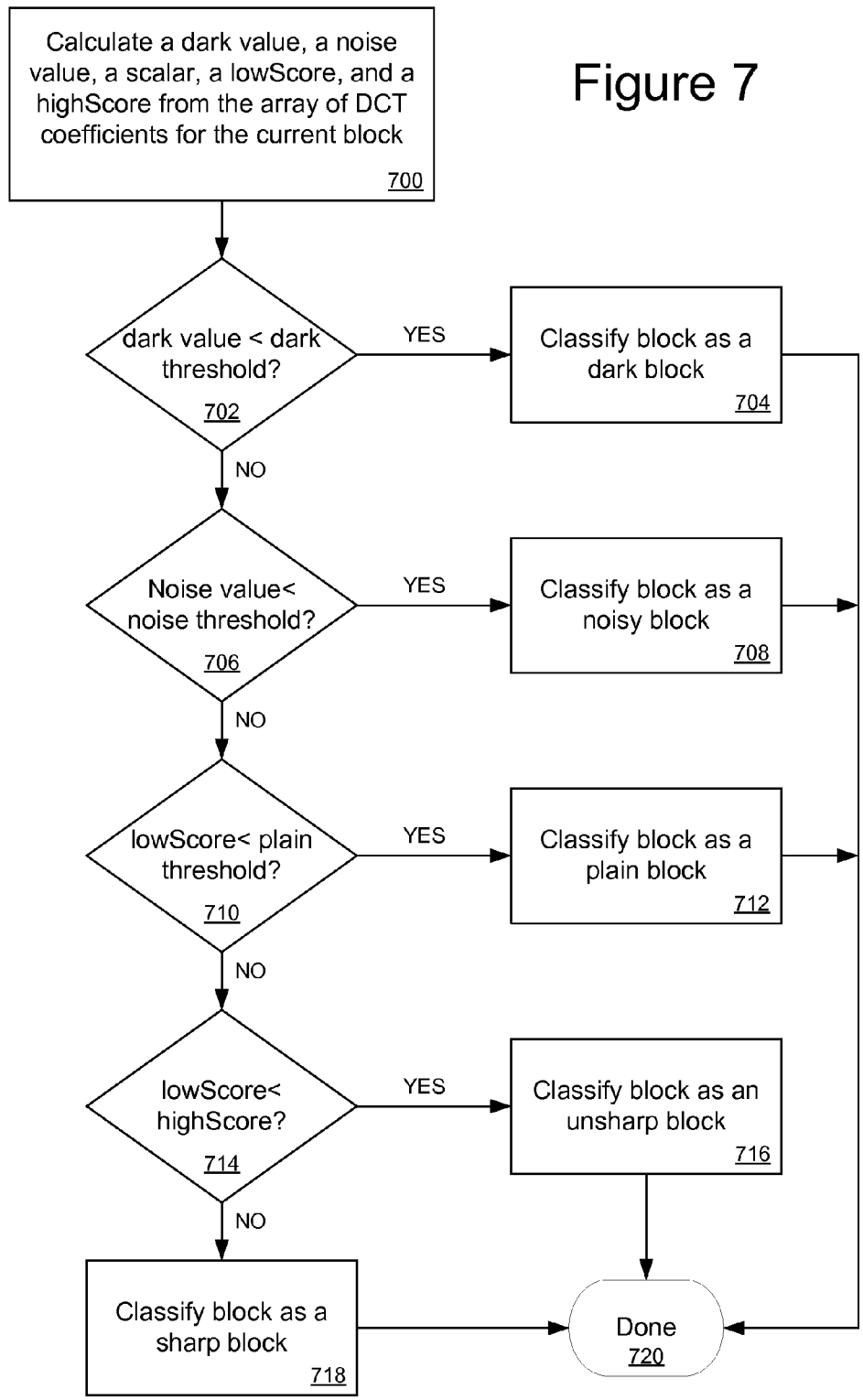
FIG. 7 is a flowchart illustrating a method for classifying blocks according to an embodiment of the invention.

FIG. 7 is a flowchart illustrating a method for classifying blocks according to an embodiment of the invention. This example method for classifying blocks is performed on each unmasked block. In this method, blocks are classified as one of five different block types: dark, noisy, plain, unsharp, or sharp. Those of skill in the art will recognize that there are a wide variety of different classifications available, and a wide variety of methods for determining these classifications, all within the scope of the present invention. For example, some embodiments may simply lump together the dark, noisy, and plain blocks into a single classification since these blocks are not used in calculating a focus level. Other embodiments may include other block types. In this example embodiment, in an operation 700, a dark_value, a noise_value, a scalar, a lowScore, and a highScore are calculated from the array of DCT coefficients for the current block. In all of the following calculations, dct[0:63] represents the array of DCT coefficients for the current block, as shown in FIG. 2. The dark_value is set equal to dct[0], the DC coefficient. The noise_value is calculated using the following formula:

$$\text{noise\_value} = \frac{\sum_{k=0}^{9} dct[k]}{\sum_{k=48}^{63} dct[k]}.$$

The scalar is calculated using the following formula:

$$\text{scalar} = \min\left(16, \sum_{k=48}^{63} dct[k] + 2\right).$$

The lowScore is calculated using the following formula:

$$lowScore = \left(\sum_{k=1}^{5}\left[\frac{dct[k] * \text{weight}[k]}{\text{scalar}}\right]\right) * \text{scalar}.$$

The highScore is calculated using the following formula:

$$highScore = \left(\sum_{k=6}^{63}\left[\frac{dct[k] * \text{weight}[k]}{\text{scalar}}\right]\right) * \text{scalar}.$$

In an operation 702, the dark_value is compared to a dark threshold. If the dark_value is less than the dark threshold, the block is classified as a dark block in operation 704. and the classification of the present block is completed 720. If the dark_value is greater than or equal to the dark threshold, in an operation 706, the noise_value is compared to a noise threshold. If the noise_value is less than the noise threshold, the block is classified as a noisy block in operation 708, and the classification of the present block is completed 720. If the noise_value is greater than or equal to the noise threshold, in an operation 710, the lowScore is compared to a plain threshold. If the lowScore is less than the plain threshold, the block is classified as a plain block in operation 712, and the classification of the present block is completed 720. If the lowScore is greater than or equal to the plain threshold, in an operation 714, the lowScore is compared to the highScore. If the lowScore is less than the highScore, the block is classified as an unsharp block in operation 716, and the classification of the present block is completed 720. If the lowScore is greater than or equal to the highScore, the block is classified as a sharp block in operation 718, and the classification of the present block is completed 720.

Figure 8:
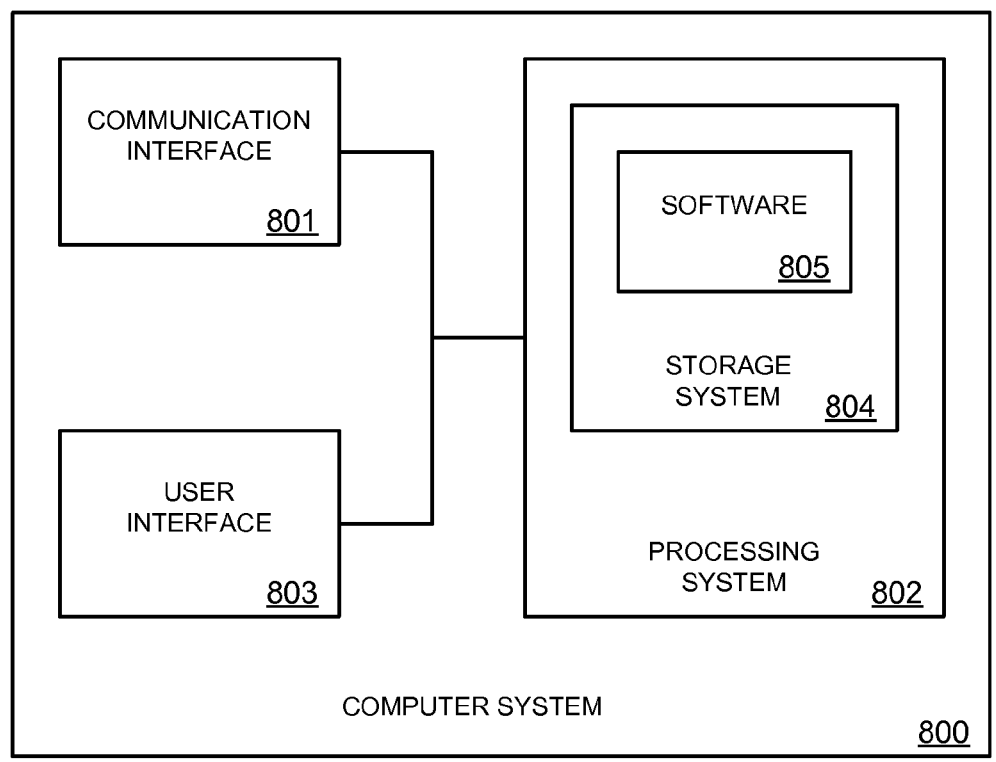
FIG. 8 is a block diagram illustrating a computer system in an embodiment of the invention.

FIG. 8 is a block diagram illustrating a computer system in an embodiment of the invention. Computer system 800 includes communication interface 801, processing system 802, and user interface 803. Processing system 802 includes storage system 804. Storage system 804 stores software 805. Processing system 802 is linked to communication interface 801 and user interface 803. Computer system 800 could be comprised of a programmed general-purpose computer, although those skilled in the art will appreciate that programmable or special purpose circuitry and equipment may be used. Computer system 800 may be distributed among multiple devices that together comprise elements 801-805.

Communication interface 801 could comprise a network interface, modem, port, transceiver, or some other communication device. Communication interface 801 may be distributed among multiple communication devices. Processing system 802 could comprise a computer microprocessor, logic circuit, or some other processing device. Processing system 802 may be distributed among multiple processing devices. User interface 803 could comprise a keyboard, mouse, voice recognition interface, microphone and speakers, graphical display, touch screen, or some other type of user device. User interface 803 may be distributed among multiple user devices. Storage system 804 could comprise a disk, tape, integrated circuit, server, or some other memory device. Storage system 804 may be distributed among multiple memory devices. The memory can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remote from one another, but can be accessed by the processor. Additionally, the memory includes an operating system, as well as instructions associated with methods for image processing. Exemplary embodiments of each of which are described above.

Processing system 802 retrieves and executes software 805 from storage system 804. Software 805 may comprise an operating system, utilities, drivers, networking software, and other software typically loaded onto a computer system. Software 805 could comprise an application program, firmware, or some other form of machine-readable processing instructions. When executed by processing system 802, software 805 directs processing system 802 to operate as described herein. In this example embodiment of the present invention, the software 805 may be configured to cause the processing system 802 to execute the operations of the methods illustrated in FIGS. 1 through 7. The storage system 804 may be configured to store the video frame, array of DCT coefficients, weight array, and results of the methods illustrated in FIGS. 1 through 7, such as the classification of the blocks, and the various thresholds described above. In such a configuration, the computer system 800 is acting as the video processor 402 shown in FIG. 4.

One should note that the flowcharts included herein show the architecture, functionality, and/or operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions (such as depicted in the flowcharts), can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A computer system, comprising:
a storage system containing software; and
a processing system coupled to the storage system;

wherein the processing system is instructed by the software to:
receive a video frame;
bias the luminance of the video frame;
partition the video frame into a plurality of blocks;
calculate an array of discrete cosine transformation (DCT) coefficients for at least one of the plurality of blocks using a DCT;
generate block classifications by classifying at least one block of the at least one of the plurality of blocks as noisy based on the array of DCT coefficients for that block;
calculate a focus level of the video frame based at least in part on the block classifications; and
trigger an out of focus alert if the focus level meets a focus criteria.

2. The computer system of claim 1,
wherein each block is classified as one block type from the group of block types consisting of: dark, noisy, plain, unsharp, or sharp.

3. The computer system of claim 1,
wherein the focus level is calculated by dividing the number of sharp blocks by the sum of the number of unsharp blocks and sharp blocks.

4. The computer system of claim 1,
wherein the focus criteria is a focus threshold.

5. The computer system of claim 1,
wherein the focus criteria includes a persistence level.

6. The computer system of claim 1,
wherein the array of DCT coefficients for a block comprises 64 coefficients.

7. The computer system of claim 6, wherein the processing system is further instructed by the software to:
calculate a dark value for the block; and
classify the block as a dark block if the dark value is less than a dark threshold.

8. The computer system of claim 7,
wherein the dark value is equal to dct[0], and
wherein dct[0:63] is the array of DCT coefficients, and dct[0] is the first element in the array of DCT coefficients.

9. The computer system of claim 8,
wherein the noise is equal to $$\frac{\sum_{k=0}^{0} dct[k]}{\sum_{k=48}^{63} dct[k]},$$

and
wherein dct[0:63] is the array of DCT coefficients.

10. The computer system of claim 6, wherein the processing system is further instructed by the software to:
scale the array of DCT coefficients by a weight factor contained in a weight array.

11. The computer system of claim 10, wherein the processing system is further instructed by the software to:
calculate a scalar from the array of DTC coefficients;
calculate a lowScore from the array of DTC coefficients; and
calculate a highScore from the array of DTC coefficients.

12. The computer system of claim 11,
wherein calculate a scalar uses the formula:

$$\text{scalar} = \min\left(16, \sum_{k=48}^{63} dct[k] + 2\right);$$

wherein calculate a lowScore uses the formula:

$$\text{lowScore} = \left(\sum_{k=1}^{5}\left[\frac{dct[k] * \text{weight}[k]}{\text{scalar}}\right]\right) * \text{scalar};$$

wherein calculate a highScore uses the formula:

$$\text{highScore} = \left(\sum_{k=6}^{63}\left[\frac{dct[k] * \text{weight}[k]}{\text{scalar}}\right]\right) * \text{scalar};$$

and
wherein dct[0:63] is the array of DCT coefficients, and weight[0:63] is the weight array.

13. The computer system of claim 11, wherein the processing system is further instructed by the software to:
classify the block as a plain block if lowScore is less than a plain threshold.

14. The computer system of claim 11, wherein the processing system is further instructed by the software to:
classify the block as an unsharp block if lowScore is less than highScore.

15. The computer system of claim 11, wherein the processing system is further instructed by the software to:
classify the block as a sharp block if:
lowScore is greater than or equal to highScore,
lowScore is greater than or equal to a plain threshold,
the dark value is greater than or equal to a dark threshold, and
the noise value is greater than or equal to a noise threshold.

16. The computer system of claim 1, wherein the processing system is further instructed by the software to:
mask the video frame.

17. A non-transitory computer-readable medium of instructions for triggering an out of focus alert in a computer system, the instructions comprising:
receiving a video frame;
biasing the luminance of the video frame;
partitioning the video frame into a plurality of blocks;
calculating an array of discrete cosine transformation (DCT) coefficients for at least one of the plurality of blocks using a DCT;
generating block classifications by classifying at least one block of the at least one of the plurality of blocks as noisy based on the array of DCT coefficients for that block;
calculating a focus level of the video frame based at least in part on the block classifications; and
triggering an out of focus alert if the focus level meets a focus criteria.

18. The non-transitory computer-readable medium of instructions of claim 17,
wherein each block is classified as one block type from the group of block types consisting of: dark, noisy, plain, unsharp, or sharp.

19. The non-transitory computer-readable medium of instructions of claim 17,
> wherein the focus level is calculated by dividing the number of sharp blocks by the sum of the number of unsharp blocks and sharp blocks.

20. The non-transitory computer-readable medium of instructions of claim 17,
> wherein the focus criteria is a focus threshold.

\* \* \* \* \*